No. 854,094. PATENTED MAY 21, 1907.
C. J. KLEIN.
ELECTRICAL CONDUCTOR AND ARMOR THEREFOR.
APPLICATION FILED SEPT. 22, 1906.
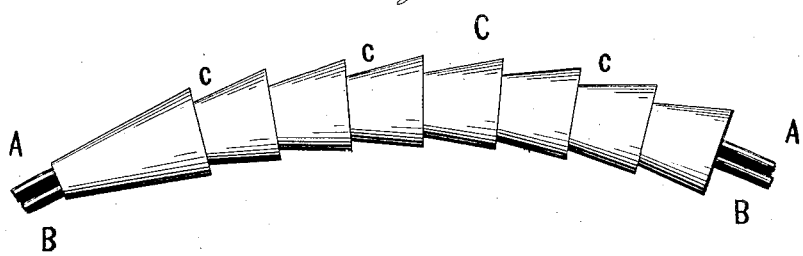
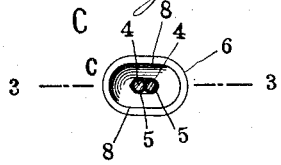 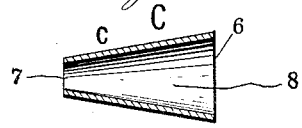
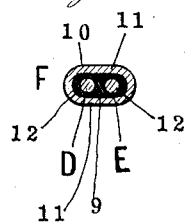 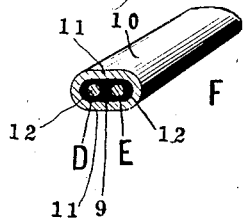
WITNESSES
INVENTOR
Charles Julian Klein,
BY
ATTORNEY

UNITED STATES PATENT OFFICE.

CHARLES JULIUS KLEIN, OF NEW YORK, N. Y., ASSIGNOR TO RALPH ABRAHAM SCHOENBERG, OF NEW YORK, N. Y.

ELECTRICAL CONDUCTOR AND ARMOR THEREFOR.

No. 854,094.        Specification of Letters Patent.        Patented May 21, 1907.

Application filed September 22, 1906. Serial No. 335,775.

*To all whom it may concern:*

Be it known that I, CHARLES JULIUS KLEIN, a citizen of the United States, residing in the borough of Manhattan, in the city, county, and State of New York, have invented certain new and useful Improvements in Electrical Conductors and Armor Therefor, of which the following is a specification.

This invention relates to electrical conductors, and more particularly to armor for electrical conductors, or combined electrical conductors and armor; and the invention has for its object to provide improvements of this nature which will be superior in point of simplicity, durability and inexpensiveness in manufacture and in general efficiency, and whereby the installation or "leading in" of conductors and armor in buildings may be facilitated.

In installing electrical conductors and the armor therefor in office and other buildings, it is customary to pass the same between the wall-beams and the metal or other lath which is supported by said beams, and upon which in turn the plaster or other wall is supported; and as but relatively small space is ordinarily found for utilizing in this manner, and because the armor, of the "Sprague" or other types, is usually circular in cross section and necessarily of a diameter exceeding that of the two conductors and their insulating covering or coverings combined: it is at times extremely difficult, especially in dealing with diameters of the larger gages, to so "lead in" and install the conductors and armor.

According to the present invention, the armor is made with a substantially oval cross-sectional formation, or flattened in form, so that the conductors extend in parallel relation between the longer or flattened sides which are caused to contact with both conductors or the insulating coverings thereof. In this method of construction the formation of unoccupied space within the armor and surrounding the conductors is dispensed with, and the conductors and armor may be readily drawn through any space or opening which will accommodate a structural dimension totaling that of one conductor and its insulating covering and the contacting armor.

The invention further comprises a number of details of construction, and will now be fully described and finally pointed out in appended claims:—

In the drawing, Figure 1 is a plan view of two insulated electrical conductors combined with a surrounding armor all according to the present invention; Fig. 2 is an end view of the armor with the conductors therein; Fig. 3 is a detail longitudinal sectional view of one of the separate members of the armor illustrated in Fig. 1; Fig. 4 is a detail transverse sectional view of a modified form of construction and arrangement embodying the invention, and Fig. 5 is a perspective view of the construction illustrated in Fig. 4.

Corresponding parts in all the figures are denoted by the same reference characters.

Referring with particularity to the drawing, and to Figs. 1, 2 and 3 inclusive thereof, A and B designate respectively electrical conductors and their inclosing insulating coverings, and C designates armor surrounding and inclosing the conductors and their insulating coverings, the conductors being arranged in contact in parallel extension within and through the armor C which latter comprises a plurality of separable members or sections c. The core 4 of each of the conductors A and B is provided with a separate surrounding insulating covering 5, such coverings being in contact and preventing short circuiting of the conductors according to established practice. Each of the members or sections c is of truncated conical, funnel, or longitudinally tapering form, being provided with a relatively large orifice 6 and a relatively small orifice 7, whereby the end portion of each of the members or sections surrounding the orifice 7 may be inserted within the end portion of a next adjacent member or section c surrounding the relatively larger orifice 6 of the latter, the members or sections being strung like beads upon the conductors A and B, the armor C being thus of articulated construction and being thus capable of being bent and coiled as required. Each of the members or sections c is furthermore of substantially oval or flattened cross-sectional form as indicated in Fig. 2, whereby two opposed parallel and substantially flat side portions 8 are provided; and the conductors A and B are passed through the members or sections c in such arrangement that the planes of said portions 8 are substantially parallel with a plane cutting the centers of both conductors, the end portions 7 of each section c being closely in contact with the conductors A and B or the insulating coverings 5 thereof. In the drawing the tapering form of the sections c is somewhat exaggerated for a more clear and complete disclosure of the invention. The members or sections c may be formed of metallic or other substantial rigid protective material, and consist substantially of flattened conical open-ended shells. Because of the articulated formation of the armor c, the latter together with the conductors A and B may be easily bent or coiled for installation, storage or shipment, and because of the overlapping union of the members or sections c increased rigidity and strain resistance of the armor are obtained.

Referring to Figs. 4 and 5, the conductors D and E which are shown as jointly embedded in or inclosed by insulating covering or material 9, are surrounded by armor F which is woven, spun, wrapped, cast or otherwise impressed directly upon the insulating material 9, and comprises a shell or protective covering 10 of substantially the same oval or flattened form as that of the members or sections c, having relatively long parallel side portions 11, the planes of which are parallel to a plane extending through the centers of the cores 12 of the conductors D and E. The shell or protective covering 10 follows closely the contour of the insulating covering 9, which latter, with the cores 12, are received or accommodated within the shell or covering 10 constituting the armor F in a close fit. The armor F may be of any preferred suitable material, metallic, textile, fibrous or other nature.

The method of use and advantages of the improvements comprised in the invention will be fully understood from the foregoing description taken in connection with the accompanying drawing together with the following statement.

Referring to Figs. 1, 2 and 3, the members or sections c of the armor C are assembled upon the conductors A and B by passing said members or sections successively upon said conductors and inserting the smaller end portion of each member or section into the larger end of a next adjacent member or section, or the members or sections may be first assembled together in the association last described, and the conductors then drawn or passed through the same.

Referring to Figs. 4 and 5, the armor F is formed or massed around the conductors D and E in any suitable manner with reference to the nature of material of which the armor F is composed.

With either of the forms illustrated and described, as well as dealing with a wide range of modification of structure not herein illustrated or described, but falling clearly within the scope of the invention, the combined conductors and armor, because of the relatively flattened conformation of the same, the greatest dimension of the combined armor and conductors being in a plane passing through the centers of both conductors, or the substantially oval cross-sectional form of the same, may readily be passed or drawn through spaces which would not accommodate combined conductors and armor of circular total cross-sectional form; and, particularly in the case of the structure illustrated in Figs. 1, 2 and 3 inclusive, the combined conductors and armor are of flexible composite structure and may thus be readily bent as required in "leading in" or installing same, and may also be readily coiled for shipment or storage.

The combined conductors and armor therefor constitute jointly an improved article of manufacture susceptible to widely ranging adaptation; and I therefore do not desire to be understood as limiting myself to the specific construction, combination and association of members and features described and shown herein, but reserve the right to vary the same, in adapting the same to varying conditions of use, without departing from the spirit of the invention or the terms of the following claims:—

Having thus described my invention, I claim and desire to secure by Letters Patent:—

1. The combination, with a plurality of electrical conductors; of armor surrounding the conductors and comprising a plurality of flattened longitudinally tapering open-ended members, the end portions of each of which is fitted into the larger end portion of an adjacent member.

2. The combination with a pair of electrical conductors provided with insulating material, of flexible armor surrounding said conductors and comprising a plurality of flattened longitudinally tapering open-ended integral metallic members, the smaller ends of each of said members engaging said insulated conductors and positioning said members with respect thereto and the larger ends of each of said members accommodating the smaller ends of the adjacent members and allowing relative angular movement between them.

3. The combination with a plurality of electrical conductors, of armor surrounding said conductors and comprising a plurality of flattened substantially conical open-ended members formed of sheet metal, the small end portion of each of said members fitting into and loosely engaging the larger end portion of the adjacent member to allow relative movement between them.

In testimony whereof, I have signed my name to this specification in the presence of two subscribing witnesses.

CHARLES JULIUS KLEIN.

Witnesses:
MICHAEL R. MATTEO,
PERCY ELIAS.